United States Patent
Cianciolo

(10) Patent No.: US 12,540,296 B2
(45) Date of Patent: Feb. 3, 2026

(54) INLET FLUID FLOW DIVERTER PORT

(71) Applicant: EMD Millipore Corporation, Burlington, MA (US)

(72) Inventor: Joseph Cianciolo, Hudson, NH (US)

(73) Assignee: EMD MILLIPORE CORPORATION, Burlington, MA (US)

(*) Notice: Subject to any disclaimer, the term of this patent is extended or adjusted under 35 U.S.C. 154(b) by 840 days.

(21) Appl. No.: 17/773,858

(22) PCT Filed: Nov. 3, 2020

(86) PCT No.: PCT/US2020/058620
§ 371 (c)(1),
(2) Date: May 3, 2022

(87) PCT Pub. No.: WO2021/150288
PCT Pub. Date: Jul. 29, 2021

(65) Prior Publication Data
US 2023/0002711 A1    Jan. 5, 2023

Related U.S. Application Data

(60) Provisional application No. 62/964,486, filed on Jan. 22, 2020.

(51) Int. Cl.
C12M 1/00    (2006.01)
(52) U.S. Cl.
CPC ............ *C12M 23/00* (2013.01); *C12M 27/20* (2013.01); *C12M 29/00* (2013.01)
(58) Field of Classification Search
None
See application file for complete search history.

(56) References Cited

U.S. PATENT DOCUMENTS

2007/0010791 A1* 1/2007 Drechsler ............... A61F 5/445
                                                         604/327
2010/0012665 A1   1/2010 Morrissey et al.
(Continued)

FOREIGN PATENT DOCUMENTS

| CN | 108778515 A | 11/2018 |
| CN | 108883954 A | 11/2018 |

(Continued)

OTHER PUBLICATIONS

Office Action received for Korean Patent Application No. 10-2022-7024986, mailing date Aug. 14, 2024, 16 pages (7 pages of English translation and 9 pages of official copy).

(Continued)

*Primary Examiner* — Holly Kipouros
(74) *Attorney, Agent, or Firm* — EMD Millipore Corporation

(57) ABSTRACT

Some embodiments of the present disclosure comprise a flow diverter for use in a biocontainer or bioreactor, comprising a shoulder having a first surface and a second surface opposite the first surface, a conduit extending from the first surface of the shoulder, an inlet at a first end of the conduit, wherein the first end comprises a connector, an outlet formed within the second surface of the shoulder in fluid communication with the inlet at an end opposite the first end of the conduit and a hood adjacent to the outlet, wherein a fluid diverter is capable of directing a fluid down a sidewall of the biocontainer or bioreactor, attenuating a splashing or foaming condition.

10 Claims, 4 Drawing Sheets

(56) References Cited

U.S. PATENT DOCUMENTS

| | | | | |
|---|---|---|---|---|
| 2012/0284991 | A1* | 11/2012 | Kusz | A61M 39/12 137/315.01 |
| 2013/0037123 | A1* | 2/2013 | Dujardin | C12M 23/14 137/15.01 |
| 2015/0051575 | A1* | 2/2015 | Thomason | A61F 5/4404 604/500 |
| 2016/0040113 | A1 | 2/2016 | Der et al. | |
| 2016/0095279 | A1* | 4/2016 | Brown | C12M 23/46 47/66.7 |
| 2017/0320027 | A1* | 11/2017 | Morrissey | B01F 33/453 |
| 2020/0316584 | A1* | 10/2020 | Fraser | B01L 3/502 |

FOREIGN PATENT DOCUMENTS

| | | |
|---|---|---|
| CN | 110582561 A | 12/2019 |
| EP | 1336588 A1 | 8/2003 |
| EP | 2020433 A2 | 2/2009 |
| JP | 2009-072182 A | 4/2009 |
| JP | 2011-523922 A | 8/2011 |
| WO | 2009/148499 A2 | 12/2009 |
| WO | 2019/121424 A1 | 6/2019 |
| WO | 2021/150288 A1 | 7/2021 |

OTHER PUBLICATIONS

International Preliminary Report on Patentability received for PCT Application No. PCT/US2020/058620, mailing date Aug. 4, 2022, 7 pages.

International Search Report and Written Opinion for International Application No. PCT/US2020/058620, dated Feb. 22, 2021, 11 pages.

Office Action received for Japanese Patent Application No. 2022-540852 mailing date Jul. 18, 2023, 9 Pages (5 Pages of English translation & 4 Pages of official copy).

First Examination Report received for Indian Application No. 202217033023 mailed on Nov. 9, 2022, 6 Pages.

Zhang, et al., "Flow rate selection and flow analysis for the Diversion Moving Bed Biofilm Reactor", Journal of Fisheries of China, vol. 35 No. 2, Feb. 15, 2011, 283-288 Pages.

* cited by examiner

INLET FLUID FLOW DIVERTER PORT

RELATED APPLICATIONS

The application is a U.S. National Stage application of International Application No. PCT/US2020/058620, filed Nov. 3, 2020, which claims the benefit of priority U.S. Provisional 62/964,486 dated Jan. 22, 2020, each of which is incorporated herein in its entirety.

The application claims the benefit of priority U.S. Provisional 62/964,486, dated Jan. 22, 2020, which is incorporated by reference in its entirety.

FIELD OF THE DISCLOSURE

This disclosure relates to the delivery, mixing and/or biomanufacturing of biological fluids within biocontainers or bioreactors. More particularly, a fluid flow diverter for use with biocontainers and bioreactors is disclosed.

DESCRIPTION OF THE PRIOR ART

Biological fluids are processed in solutions in the bioprocessing industry. Processes include, for example, cell culturing and production of desired products, e.g., cells, viruses, capsids, monoclonal antibodies, antibody drug conjugates, and inactivated viruses for use in plant and animal-based cells of the biological fluids and related therapies. During processing, chemicals, reagents, buffer solutions, adjuvants, processing aids, and the like are added to biological solutions. However, these additions are typically delivered above a fluid level, creating a splashing effect. The splashing can create an undesirable foaming and/or aeration of the biological fluid, leading to the need for the delivery of a defoaming agent.

Past attempts to deliver fluids to a bioreactor have included the use of a port located adjacent the bottom, i.e., below a fluid level, in conjunction with a pump in fluid communication therewith. However, all components in contact with biological fluids need to be sterile. Sterilizing a pump after each use is an expensive undertaking and failure modes are many. Moreover, pumps are too expensive to be used once and discarded. And, if a flow diverter is used at a submerged inlet, "dead" spots are created in the bioreactor, i.e., areas in which liquids are too insulated from mixing and, therefore, any components that settle undissolved tend to remain undissolved. Furthermore, the inlet port tends to be adjacent an outlet port attached to a conduit, wherein the conduit is disposed between the outlet port and a valve outside the bioreactor. Undissolved components can unfavorably collect in the conduit, leading to a waste of reagents and concentration variability in biological solutions. If two fluids must be delivered to the bottom of a bioreactor, two flow diverters would be needed as well as a baffle(s) disposed near the bottom, creating stagnant areas.

A flow diverter(s), which allows the quick delivery of a retentate, reagents, buffer solutions, chemicals, and the like above a fluid level to a biocontainer or bioreactor without creating a splashing or aerating condition and overcomes the limitations of the technology described above represents an advance in the art.

SUMMARY OF SOME EMBODIMENTS

Some embodiments of the present disclosure comprise a flow diverter for use in a biocontainer or bioreactor, comprising a shoulder having a first surface and a second surface opposite the first surface, a conduit extending from the first surface of the shoulder, an inlet at a first end of the conduit, wherein the first end comprises a connector, an outlet formed within the second surface of the shoulder in fluid communication with the inlet at an end opposite the first end of the conduit and a hood adjacent to the outlet, wherein a fluid diverter is capable of directing a fluid down a sidewall of the biocontainer or bioreactor, attenuating a splashing or foaming condition.

Some embodiments of the present disclosure comprise a flow diverter for use in a biocontainer or bioreactor, comprising a shoulder having a first surface and a second surface opposite the first surface, a conduit extending from the first surface of the shoulder, an inlet at a first end of the conduit, wherein the first end comprises a connector, an outlet formed within the second surface of the shoulder in fluid communication with the inlet at an end opposite the first end of the conduit and a deflecting film bonded to adjacent to the outlet, wherein a fluid diverter is capable of directing a fluid down a sidewall of the biocontainer or bioreactor, attenuating a splashing or foaming condition.

Some embodiments of the present disclosure comprise, optionally, a plurality of flow diverters for use in a single use biocontainers or bioreactors.

These and other provisions will become clear from the description, claims, and figures below. Various benefits, aspects, novel and inventive features of the present disclosure, as well as details of exemplary embodiments thereof, will be more fully understood from the following description and drawings. So the manner in which the features disclosed herein can be understood in detail, more particular descriptions of the embodiments of the disclosure, briefly summarized above, may be had by reference to the appended drawings. It is to be noted, however, that the appended drawings illustrate only typical embodiments of this disclosure and are therefore not to be considered limiting of its scope, for the described embodiments may admit to other equally effective flow diverters. It is also to be understood that elements and features of one embodiment may be found in other embodiments without further recitation and that, where possible, identical reference numerals have been used to indicate comparable elements that are common to the figures. As used herein, the singular forms "a," "an," and "the" include plural referents unless the context clearly dictates otherwise. Unless defined otherwise, all technical and scientific terms used herein have the same meaning as commonly understood by one of ordinary skill in the art to which these embodiments pertain. Also, the following terms used herein are subject to the following definitions, unless the context indicates otherwise.

DETAILED DESCRIPTION

Figure 1A:
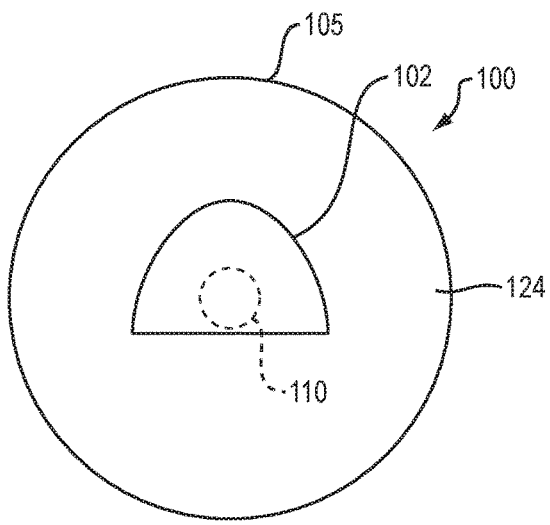
FIG. 1A depicts a front plan view of a flow diverter, according to embodiments of the present disclosure.

FIG. 1A depicts a front plan view of a flow diverter 100, according to embodiments of the present disclosure. The flow diverter 100 comprises a hood 102, which extends from an inner surface 124 of a shoulder 105. Also shown, in hidden lines, is an inner diameter 110 of a conduit for delivering a fluid, described below, supplied through an inlet at the end of a barb connector. As shown, the flow diverter 100 is circular although, in practice, the flow diverter 100 can be any suitable shape, i.e., square, rectangular, and the like.

Figure 1B:
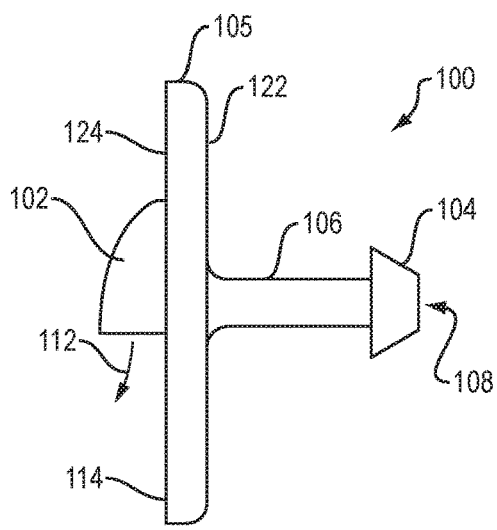
FIG. 1B depicts a right plan view of the flow diverter of FIG. 1A, according to embodiments of the present disclosure.

FIG. 1B depicts a right plan view of the flow diverter 100 of FIG. 1A, according to embodiments of the present disclosure. The flow diverter 100 comprises a barb connector 104 at the distal end of a conduit 106, which extends from an external surface 122 that is opposite the inner surface 124. The flow diverter 100 further comprises an outlet 112 in fluid communication with an inlet 108.

Figure 1C:
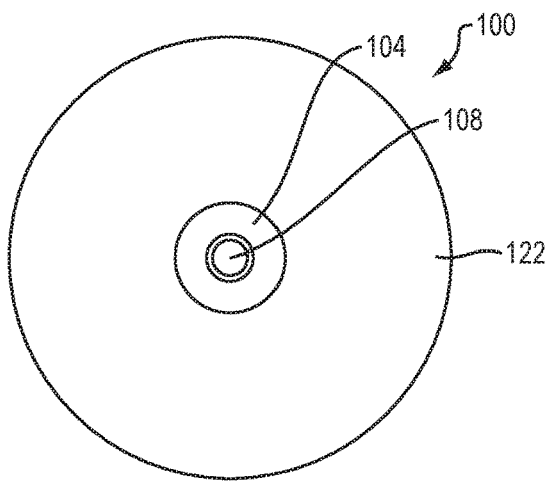
FIG. 1C depicts a rear plan view of the flow diverter of FIG. 1A.
Figure 1D:
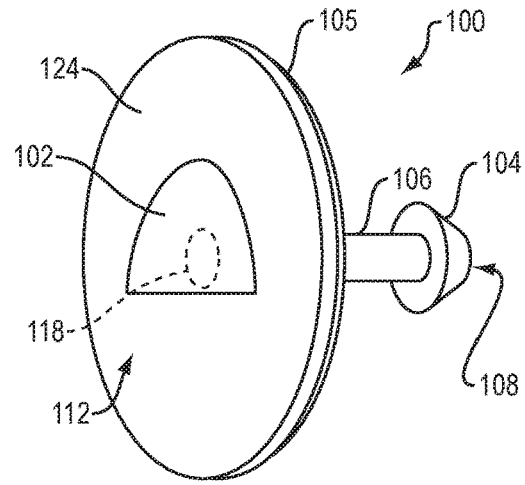
FIG. 1D depicts a lower perspective view of the flow diverter of FIG. 1A, according to embodiments of the present disclosure.
Figure 1E:
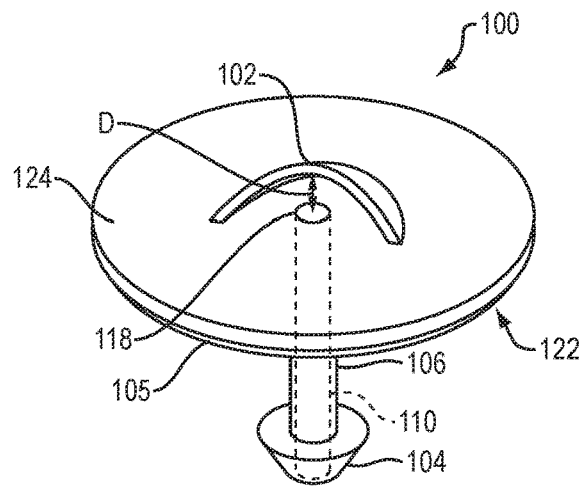
FIG. 1E depicts a bottom perspective view of the flow diverter of FIG. 1A, according to embodiments of the present disclosure.

FIG. 1C depicts a rear plan view of the flow diverter 100 of FIG. 1A. the barb connector 104 has a chamfered surface and depicts the inlet 108. FIG. 1D depicts a lower perspective view of the flow diverter 100 of FIG. 1A, according to embodiments of the present disclosure. The hood 102 is shown extending from the inner surface 124 and having an outlet 112 under the hood 102, which deflects liquid supplied through an outlet 118. FIG. 1E depicts a bottom perspective view of the flow diverter 100 of FIG. 1A, according to embodiments of the present disclosure. As shown, the hood 102 extends from the inner surface 124 and is a distance D from the outlet 118. It is depicted that the outlet 118 is in fluid communication with the inner diameter 110 of the conduit 106. The flow diverter 100 may be made of high-density polyethylene (HDPE), acrylonitrile-butadiene-styrene (ABS), nylon 6, nylon 66, nylon 46, polyether sulfone, polysulfone, and other sterilizable polymers typically used in the bioprocessing industry, i.e., by steaming, or alcohol solutions sterilization processes as are known to those in the art. Gamma radiation sterilization processes may be used for polymers that are gamma-stable, e.g., HDPE. The flow diverter 100 may be manufactured using, for example, injection molding processes and may be a single integral piece, i.e., molded via a single injection molding process. In some embodiments, the flow diverter can also be manufactured through additive manufacturing (3D Printing) in various materials. In some embodiments, the flow diverter 100 is machined from a single stock piece, i.e., plastic, ceramic, or metal. The flow diverter 100 may also be more than one piece, which are joined by adhesives or heat-staking processes. It is to be understood that fluid entering the flow diverter 100, at the inlet 108 exits the flow diverter 100 at the outlet 112. The outlet 112 is oriented such that the fluid flows and/or is directed parallel to a side wall of a biocontainer or bioreactor, wherein the fluid runs down a sidewall of the biocontainer. As shown above, the fluid, upon exiting the outlet 112, above a fluid level within a biocontainer or bioreactor, runs along a side surface 114, wherein splashing or foaming is reduced or eliminated. The flow diverter 100 may be adhered, such as with adhesives, heat-staking, bonding, or other joining methods, to a film along the external surface 122. In some embodiments, the bond surrounds the film and the flow diverter 100, i.e., 360° bond area.

Figure 2A:
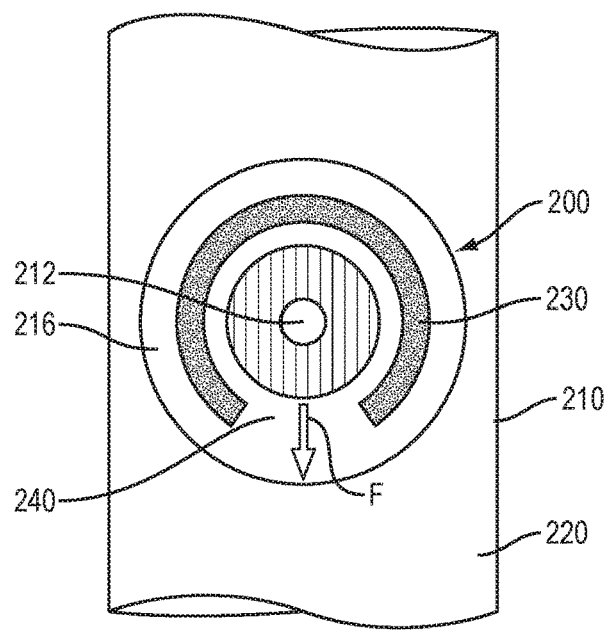
FIG. 2A depicts a front plan view of a second embodiment of a flow diverter, according to embodiments of the present disclosure.

FIG. 2A depicts a front plan view of a second embodiment of a flow diverter 200, according to embodiments of the present disclosure. FIG. 2A depicts the front view from inside a bioreactor, e.g., an internal surface 220 of a film, comprising a wall 210. The flow diverter 200 is shown as being incorporated into a wall 210, i.e., the wall 210 may be a component of a biocontainer or bioreactor. FIG. 2A shows the flow diverter 200 partially in cross section. A bonded section 230 shows a film to film bond. A deflecting film 216 is bonded to the film of the wall 210. The bonded section 216 does not form a continuous bond, i.e., not a circumferential or 360° bond. As shown, the bonded section 230 comprises approximately 300° bonding area. In an unbonded section 240, liquid that traverses through the conduit and out an outlet 212, contacts the deflecting film 216 and subsequently flows in the direction F. As shown, the unbonded area is approximately twice the width of the diameter of the outlet 212. In practice, the unbonded area 240 could be, for example, the same width as the diameter of the outlet 212 or three or four times the diameter. The unbonded section 240 is located under the outlet 212 so that the fluid can flow down the sidewall of the biocontainer.

The wall 210 may be the wall of a single use biocontainer/bioreactor, e.g., the wall 210 comprises a plastic film as is known to those in the art. The flow diverter 200 may also be permanently incorporated into a stainless-steel tank or be releasably joined to the stainless-steel tank and discarded after one or more uses. In some embodiments, the wall 210 and the deflecting film 216 comprise the same materials. In general, a bioreactor comprises a multi-layer laminate in which the inner surface 220 is a polyethylene, which is both non-toxic to living cells and emits little to no chemical extractables.

Figure 2B:
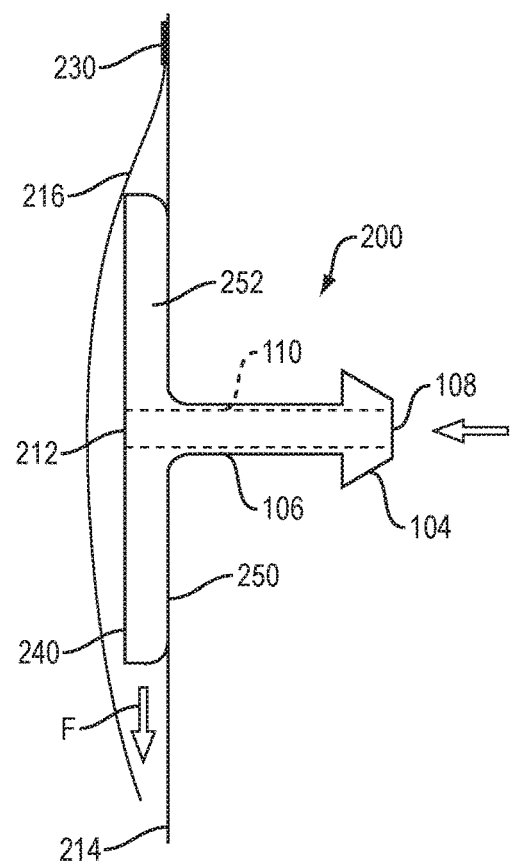
FIG. 2B depicts a side plan view of the second embodiment of a flow diverter of FIG. 2A, according to embodiments of the disclosure.

FIG. 2B depicts a side plan view of the second embodiment of a flow diverter 200 of FIG. 2A, according to embodiments of the disclosure. As above, with respect to the flow diverter 100, the flow diverter 200 comprises a barb connector 104 and inlet 108 at the distal end of a conduit 106, having an inner diameter 110, that terminates at a shoulder 252, and an external surface 250, which is bonded to the film 214 of the bioreactor or biocontainer.

Figure 3:
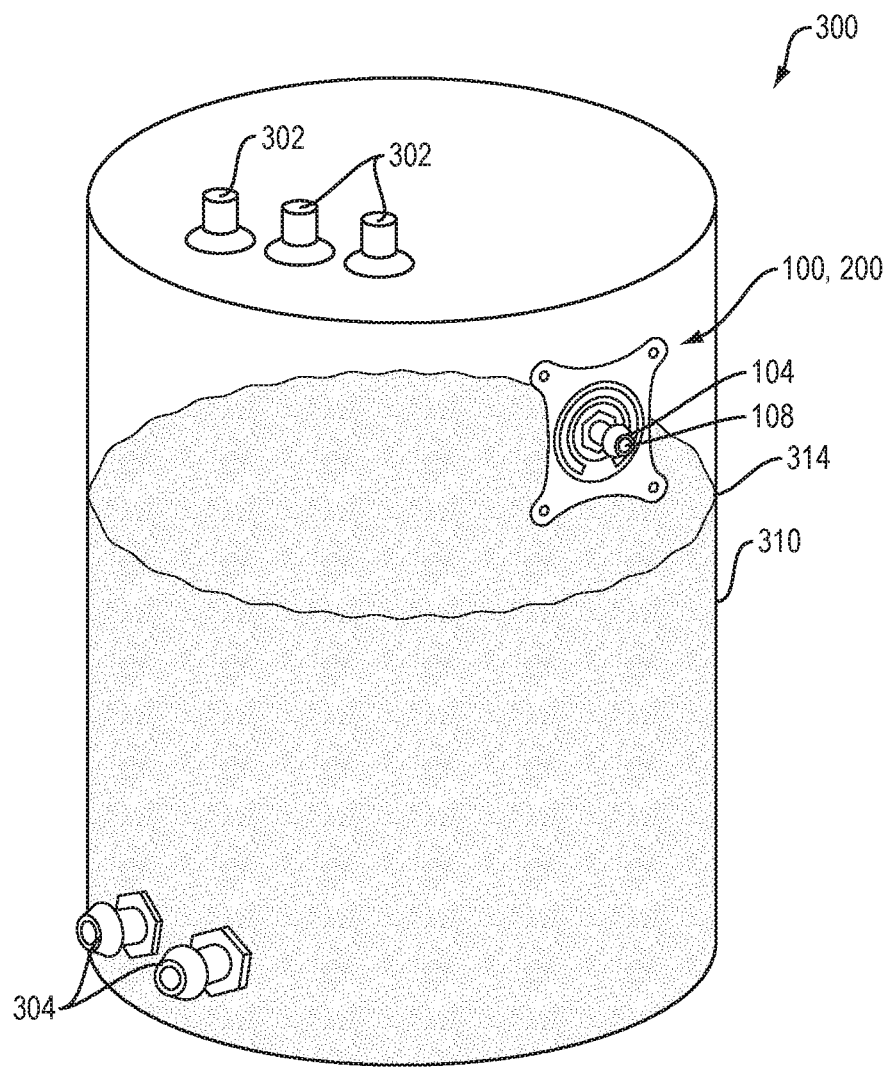
FIG. 3 depicts a biocontainer comprising either of the flow diverters of FIG. 1A or 2A, according to some embodiments of the disclosure.

FIG. 3 depicts an external view of a biocontainer 300 comprising either of the flow diverters 100, 200 of FIG. 1A or 2A, according to some embodiments of the disclosure. The biocontainer 300 comprises upper inlets 302 and outlets 304. The biocontainer 300 also comprises a flow diverter 100, 200 on a sidewall 310, which is disposed above a fluid level 314, for delivery of a fluid, such as a biological fluid, a biological processing aid, a buffer solution, an adjuvant solution, or other fluids used in bioprocessing, as are known to those in the art, through the barb connector 104 and inlet 108.

Figure 4:
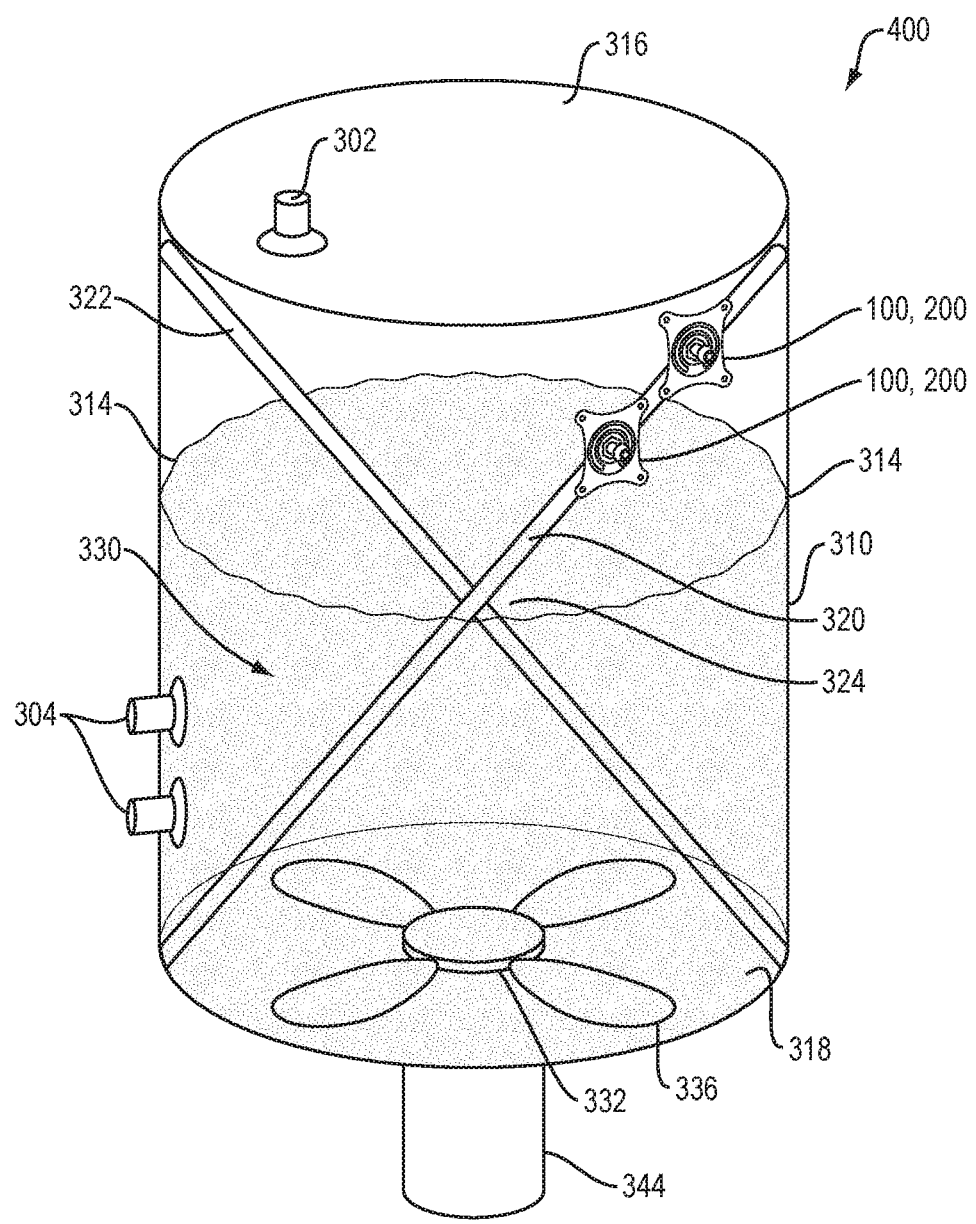
FIG. 4 depicts a biocontainer comprising a plurality of flow diverters and a flexible film baffle, according to some embodiments of the disclosure.

FIG. 4 depicts a biocontainer 400 comprising a plurality of flow diverters 100, 200 and a flexible film baffle 324, according to some embodiments of the disclosure. Flexible film baffles disclosed herein are described in US 2016/0040113A1, which is incorporated by reference in its entirety. According to some embodiments, described is a container 400 having a bottom surface 318, a top surface 316, and sidewalls 310, such as a disposable or single use container, having an inner volume 330, optionally having one or more inlets 302 and one or more flow diverters 100,200, one or more outlets 304 and a mixer comprising a drive 334 and an agitator 332 associated with the container to cause mixing and dispersing of one or more ingredients contained or added to the container. The drive 334 may be a shaftless drive, wherein the agitator comprises a magnet (not shown) and blades 336. According to some embodiments, the container 400 includes a flexible baffle 324 shaped and positioned within the container 400 to improve mixing. The baffle 324 is positioned within the container so as to disrupt a vortex formed by the mixer or prevent formation of a vortex, wherein the baffle 324 projects out of the fluid contained within the inner volume 330 of the biocontainer 400. The formation of a vortex may cause stagnant zones of inadequate mixing and is often associated with a single agitator. A flexible baffle 324 having a first diagonal member 322 and a second diagonal member 320 opposite the first diagonal member can be added to suppress vortex formation. As shown, the second diagonal member 320 is disposed in front of the first diagonal member 322. In practice, the first diagonal member 322 and the second diagonal member 320 may be a single piece. In some embodiments, both the first diagonal member 322 and the second diagonal member 320 may pass through a center point of the inner volume 330. In some embodiments, the first diagonal member 322 and the second diagonal member 320 may not pass through a center point. The location of the mixer can dictate where a vortex may form. For example, the vortex may form closer to a sidewall 310 if the mixer itself is closer to a sidewall 310. Accordingly, providing a baffle 324 having diagonal members 320, 322, which extend from the bottom surface 318 to the top surface 316 necessarily allows disruption of any vortex formed irrespective of any fluid level 314. As above, the biocontainer 400 also comprises a plurality of flow diverters 100, 200 on a sidewall 310, which is disposed above a fluid level 314, for delivery of a fluid, such as a biological fluid, a biological processing aid, a buffer solution, an adjuvant solution, or other fluids used in bioprocessing, as are known to those in the art, wherein the flow diverters 100, 200 allow any fluid entering the ports to flow down the sidewall 310, attenuating any potential splashing or foaming conditions. As shown, the biocontainer 400 comprises a plurality of flow diverters 100, 200. It is to be understood that the biocontainer 300 may also comprise a plurality of flow diverters 100, 200. Providing a plurality of flow diverters 100, 200 allows for a plurality of liquids to be delivered to the inner volume 330 of the biocontainer 400. For example, some perfusion or tangential flow filtration processes include the re-circulation of a retentate fluid following a filtration step, wherein the retentate is drawn from the biocontainer 400 and is subsequently delivered to the biocontainer 400 via one of the flow diverters 100, 200 following a filtration step. Similarly, a buffer solution or adjuvant solution may be delivered to the biocontainer 400 through one or more of the flow diverters 100, 200.

The flow diverter 100, 200 may be made of high-density polyethylene (HDPE), nylon 6, nylon 66, nylon 46, polyether sulfone, acrylonitrile-butadiene-styrene (ABS) or copolymers or blends thereof, and other sterilizable polymers typically used in the bioprocessing industry. The flow diverter 100, 200 may be manufactured using, for example, injection molding processes, machining processes, milling processes, 3D printing, and the like. In some embodiments, the flow diverter 100, 200 comprises low density polyethylene (LDPE), linear-low density polyethylene (LLDPE), cellulosics, phenolics, thermosetting polyesters and thermosetting polyurethanes, polyethylene terephthalate, or polybutylene terephthalate, polyvinylidene fluoride, ethylene-tetrafluoroethylene and copolymers or blends thereof.

It is to be noted that any biocontainer or bioreactor may optionally have a plurality of inlets and, therefore, optionally, a plurality of flow diverters. It is to be further noted that, optionally, the flow diverters are made of plastic and all corners, etc., are radiused so that where the flow diverters are joined to a bioreactor or biocontainer before shipping, the risk of the flow diverters puncturing or abrading the bioreactor or biocontainer is minimized. Such designs further prevent the bioreactors/biocontainers from having the sterility compromised during or after shipping. It is to be further understood that any and all embodiments of the flow diverters 100, 200 and others have many advances over the prior art. Any of the flow diverters described herein can be scaled to differing sizes, e.g., external sizes, internal diameters for conduits, differently sized connectors, differing connector styles, etc., so accommodate various tubing, ports, connectors to stably control the addition of various fluids.

All ranges for formulations recited herein include ranges therebetween and can be inclusive or exclusive of the endpoints. Optional included ranges are from integer values therebetween (or inclusive of one original endpoint), at the order of magnitude recited or the next smaller order of magnitude, e.g., if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "one embodiment," "one or more embodiments," "some embodiments," or "an embodiment" indicates that a feature, structure, material, or characteristic described in connection with the embodiment is included in at least one embodiment of the disclosure. Therefore, the appearances of the phrases such as "in one or more embodiments," "in certain embodiments," "in one embodiment," "some embodiments," or "In an embodiment" throughout this specification are not necessarily referring to the same embodiment. Nonetheless, it is to be understood that any feature described herein can be incorporated within any embodiment(s) disclosed herein.

Passages of publications of patent applications, patents and non-patent references, cited in this specification are herein incorporated by reference in their entirety as if each publication or reference were specifically and individually indicated to be incorporated by reference herein as being fully set forth. Patent applications to which this application claims priority are also incorporated by reference in entirety.

What is claimed is:
1. A flow diverter for use in a biocontainer or bioreactor, comprising:
 a shoulder having a first surface and a second surface opposite the first surface;
 a conduit extending from the first surface of the shoulder;
 an inlet at a first end of the conduit, wherein the first end comprises a connector;
 a first outlet formed within the second surface of the shoulder in fluid communication with the inlet at an end opposite the first end of the conduit; and a hood adjacent to the first outlet, the hood extending from the second surface and comprising a second outlet which, in use, deflects fluid supplied through the first outlet, wherein the hood of the flow diverter is capable of directing a fluid down a sidewall of the biocontainer or bioreactor, attenuating a splashing or foaming condition.

2. The flow diverter of claim 1, wherein the flow diverter is formed of one of high-density polyethylene (HDPE), low density polyethylene (LDPE), linear-low density polyethylene (LLDPE), acrylonitrile-butadiene-styrene (ABS), nylon 6, nylon 66, nylon 46, cellulosics, phenolics, thermosetting polyesters and thermosetting polyurethanes, polyethylene terephthalate, polybutylene terephthalate, polyvinylidene fluoride, ethylene-tetrafluoroethylene, polysulfone, or polyether sulfone.

3. The flow diverter of claim 1, wherein the flow diverter is bonded to the sidewall of the biocontainer or bioreactor.

4. The flow diverter of claim 1, wherein the biocontainer or bioreactor comprises a single-use biocontainer or bioreactor.

5. The flow diverter of claim 1, wherein the biocontainer or bioreactor comprises a multi-layer plastic film.

6. A biocontainer or bioreactor, comprising:
a top surface, a bottom surface, and a sidewall disposed between the top surface and the bottom surface, wherein an inner volume for holding a liquid is formed between the top surface and the bottom surface;
the flow diverter of claim 1 disposed on the sidewall; and
one or more fluid outlets.

7. The biocontainer or bioreactor of claim 6, wherein the flow diverter is formed of one of high-density polyethylene (HDPE), low density polyethylene (LDPE), linear-low density polyethylene (LLDPE), acrylonitrile-butadiene-styrene (ABS), nylon 6, nylon 66, nylon 46, cellulosics, phenolics, thermosetting polyesters and thermosetting polyurethanes, polyethylene terephthalate, polybutylene terephthalate, polyvinylidene fluoride, ethylene-tetrafluoroethylene, polysulfone, or polyether sulfone.

8. The biocontainer or bioreactor of claim 6, wherein the biocontainer or bioreactor comprises a multi-layer plastic film.

9. The biocontainer or bioreactor of claim 6, wherein the flow diverter is disposed above a fluid level within the biocontainer or bioreactor.

10. The biocontainer or bioreactor of claim 6, further comprising a baffle.

* * * * *